US011676550B2

(12) United States Patent
Nishiike

(10) Patent No.: US 11,676,550 B2
(45) Date of Patent: Jun. 13, 2023

(54) SPATIAL LIGHT MODULATOR SYSTEM, SPATIAL LIGHT MODULATOR DEVICE, AND DISPLAY APPARATUS FOR PREVENTING INFLUENCES OF MECHANICAL OPERATIONS OF A LIGHT MODULATION UNIT

(71) Applicant: SONY GROUP CORPORATION, Tokyo (JP)

(72) Inventor: Akihito Nishiike, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/417,591

(22) PCT Filed: Dec. 17, 2019

(86) PCT No.: PCT/JP2019/049306
§ 371 (c)(1),
(2) Date: Jun. 23, 2021

(87) PCT Pub. No.: WO2020/145046
PCT Pub. Date: Jul. 16, 2020

(65) Prior Publication Data
US 2022/0059041 A1    Feb. 24, 2022

(30) Foreign Application Priority Data
Jan. 7, 2019    (JP) .............................. JP2019-000648

(51) Int. Cl.
G09G 3/34        (2006.01)
G02B 26/08       (2006.01)

(52) U.S. Cl.
CPC ......... *G09G 3/346* (2013.01); *G02B 26/0841* (2013.01); *G09G 2300/0857* (2013.01);
(Continued)

(58) Field of Classification Search
CPC .............. G02B 26/0841; G09G 3/346; G09G 2300/0857; G09G 2310/0267;
(Continued)

(56) References Cited

U.S. PATENT DOCUMENTS

| 5,499,062 A | 3/1996 | Urbanus |
| 2004/0037490 A1 | 2/2004 | Tochio et al. |

(Continued)

FOREIGN PATENT DOCUMENTS

| CN | 1120678 A | 4/1996 |
| CN | 1914537 A | 2/2007 |

(Continued)

OTHER PUBLICATIONS

International Search Report and Written Opinion of PCT Application No. PCT/JP2019/049306, dated Feb. 10, 2020, 11 pages of ISRWO.

*Primary Examiner* — Adam J Snyder
(74) *Attorney, Agent, or Firm* — Chip Law Group

(57) ABSTRACT

Provided is a spatial light modulator device that includes a light modulation unit, a first memory, and a second memory. The light modulation unit performs a transition operation between a first state and a second state. In the first memory, data for specifying which one state of the first state and the second state the light modulation unit is to be put in is written during a transition time in which the transition operation is performed. In the second memory, the data retained in the first memory is written after the transition time ends and the second memory supplies the data to the light modulation unit.

16 Claims, 13 Drawing Sheets

(52) U.S. Cl.
CPC . *G09G 2310/0267* (2013.01); *G09G 2310/08* (2013.01); *G09G 2320/0247* (2013.01); *G09G 2320/0252* (2013.01)

(58) Field of Classification Search
CPC ....... G09G 2310/08; G09G 2320/0247; G09G 2320/0252
See application file for complete search history.

(56) References Cited

U.S. PATENT DOCUMENTS

| | | | |
|---|---|---|---|
| 2004/0212576 A1* | 10/2004 | Schloeman | G09G 3/346 345/98 |
| 2004/0246554 A1 | 12/2004 | Kaeriyama | |
| 2005/0002079 A1* | 1/2005 | Novotny | G02B 26/0841 359/245 |
| 2005/0219676 A1* | 10/2005 | Kimura | G09G 3/346 359/238 |
| 2006/0103912 A1* | 5/2006 | Katoh | G02B 26/0841 359/254 |
| 2007/0109021 A1* | 5/2007 | Nguyen | G11C 11/412 326/83 |
| 2008/0231568 A1* | 9/2008 | Chen | G09G 3/346 345/84 |
| 2009/0015530 A1 | 1/2009 | Goetz et al. | |
| 2010/0207934 A1 | 8/2010 | Kato | |

FOREIGN PATENT DOCUMENTS

| | | | | |
|---|---|---|---|---|
| CN | 101276550 | A | 10/2008 | |
| CN | 101523284 | A | 9/2009 | |
| EP | 689181 | A1 | 12/1995 | |
| JP | H01213616 | A | 8/1989 | |
| JP | 07-174985 | A | 7/1995 | |
| JP | 08-201707 | A | 8/1996 | |
| JP | 09-238106 | A | 9/1997 | |
| JP | 2004-085596 | A | 3/2004 | |
| JP | 2005-309414 | A | 11/2005 | |
| JP | 2008-233898 | A | 10/2008 | |
| JP | 2009-540341 | A | 11/2009 | |
| JP | 2017129746 | A * | 7/2017 | ............ G09G 3/20 |
| KR | 10-2009-0047400 | A | 5/2009 | |
| WO | 2007/143105 | A2 | 12/2007 | |

\* cited by examiner

SPATIAL LIGHT MODULATOR SYSTEM, SPATIAL LIGHT MODULATOR DEVICE, AND DISPLAY APPARATUS FOR PREVENTING INFLUENCES OF MECHANICAL OPERATIONS OF A LIGHT MODULATION UNIT

CROSS REFERENCE TO RELATED APPLICATIONS

This application is a U.S. National Phase of International Patent Application No. PCT/JP2019/049306 filed Dec. 17, 2019, which claims priority benefit of Japanese Patent Application No. JP 2019-000648 filed in the Japan Patent Office on Jan. 7, 2019. Each of the above-referenced applications is hereby incorporated herein by reference in its entirety.

TECHNICAL FIELD

The present technology relates to a spatial light modulation system, a spatial light modulator device, and a display apparatus that are associated with operation control on a light modulation unit.

BACKGROUND ART

A spatial light modulator device is a device that modulates light by electrically controlling a spatial distribution (amplitude, phase, polarization, and the like) of light from a light source, and is used in the fields of display apparatuses such as projectors, sensors, 3D printers, and the like.

The spatial light modulator device is constituted by an address unit and a light modulation unit, and is capable of changing the optical characteristics of the light modulation unit by information written in the address unit. The light modulation unit typically includes a micromirror and a drive mechanism that varies its angle and enables transition between a state reflecting incident light and a state not reflecting incident light to be performed by varying the angle of the micromirror.

In a display apparatus using such a micromirror device, "bright" and "dark" are expressed in the reflection state and the non-reflection state of the micromirror, and gradation is expressed by changing the time ratio of "bright" and "dark" in one frame. In this case, a pulse width modulation (PWM) technique in which one frame is controlled by a time ratio corresponding to the intensity of gradation bits of a single color or a plurality of colors is employed.

The lowest-order bit in the PWM technique is called least significant bit (LSB), and the minimum update time of the micromirror is equivalent to a shortest time that can be realized as the LSB. In general, the LSB time is approximately several tens of μs. If the LSB time can be shortened, it is possible to cause the micromirror to transition at a higher speed, and it is possible to improve the performance of the display apparatus.

However, in a micromirror device, it is necessary to mechanically change the angle of the micromirror between the reflection state and the non-reflection state as described above, and it is impossible to perform next transition before mechanical vibrations of the micromirror converge after transition. It is because the micromirror enters an unstable state if the transition is performed before the mechanical vibrations converge. Therefore, it has been necessary to wait for the next transition until the mechanical vibrations converge, and there has been a limit in shortening the LSB time.

For example, Patent Literature 1 has disclosed a technology in which the time until the mechanical vibrations after the micromirror transition converge is considered as the LSB time, a reset pulse for transitioning the micromirror to a flat or OFF state is applied, and next update data is written in the address unit in the flat state. Although it depends on the number of pixels (number of mirrors) of the micromirror device and the writing frequency, the writing time of the update data is several μs to several tens of μs.

In addition, Patent Literature 2 has disclosed a technology in which in a case where the micromirror is continuously ON/OFF in the LSB time, the update data is not written until the mechanical vibrations of the micromirror converge and the total time of the time until the mechanical vibrations converge and the writing time of the update data is considered as the LSB time.

CITATION LIST

Patent Literature

Patent Literature 1: Japanese Patent Application Laid-open No. HEI 9-238106
Patent Literature 2: Japanese Patent Application Laid-open No. HEI 7-174985

DISCLOSURE OF INVENTION

Technical Problem

However, the control method disclosed in Patent Literature 1 has a problem in that the use efficiency of light is lowered and accurate gradation expression cannot be performed because of the time to put the micromirror in the flat or OFF state. Further, since there are two types of sequences for updating the micromirror, i.e., a normal update sequence and a sequence for applying the reset pulse, there is a problem that parameters of a controller for controlling it increase.

Also in the control method of Patent Literature 2, the writing time increases as the number of pixels (resolution) of the micromirror device increases and the minimum update interval of the micromirror is longer, and thus it becomes a constraint in realizing high resolution and high-speed response.

In view of the above-mentioned circumstances, it is an object of the present technology to provide a spatial light modulator device, a spatial light modulator system, and a display apparatus that are capable of preventing influences of mechanical operations of a light modulation unit on a minimum update interval.

Solution to Problem

In order to accomplish the above-mentioned object, a spatial light modulator device according to the present technology includes a light modulation unit, a first memory, and a second memory.

The light modulation unit performs a transition operation between a first state and a second state.

In the first memory, data for specifying which one state of the first state and the second state the light modulation unit is to be put in is written during a transition time in which the transition operation is performed.

In the second memory, the data retained in the first memory is written after the transition time ends and the second memory supplies the data to the light modulation unit.

With this configuration, the data for specifying which one state of the first state and the second state the light modulation unit is to be put in is written in the first memory during a transition time in which the light modulation unit performs the transition operation, and the data is written in the second memory from the first memory after the transition time ends. The data is supplied to the light modulation unit from the second memory and the light modulation unit performs a next transition operation in accordance with the data. Since the second memory that supplies the data to the light modulation unit is updated during the transition operation, the data can be written in the first memory in parallel during the transition operation of the light modulation unit. Thus, it is possible to shorten the LSB time.

The light modulation unit may include a light reflector that reflects incident light and a drive mechanism that changes an angle of the light reflector, and the light reflector may be inclined at a first angle in the first state and is inclined at a second angle in the second state.

The transition time may be the sum of an angle change time that is a time in which the angle of the light reflector is changed and a settling time that is a time until vibrations of the light reflector converge after the change of the angle.

The drive mechanism may include an address electrode connected to the second memory and the address electrode may have a potential which is determined by the data.

The address electrode may include a first address electrode and a second address electrode and the data may determine a potential difference between the first address electrode and the second address and a reference potential.

The light reflector may include a mirror electrode that causes electrostatic attraction between the first address electrode and the second address electrode and have the first angle or the second angle due to the electrostatic attraction.

The light reflector may be a micromirror, and the drive mechanism may be constituted by a micro electro mechanical systems (MEMS).

The first memory may be a static random access memory (SRAM), and the second memory may be a dynamic random access memory (DRAM).

The first memory and the second memory may be SRAMs.

The first memory and the second memory may be DRAMs.

The spatial light modulator device may further include: a first circuit board on which the first memory is formed; and a second circuit board on which the second memory is formed and which is stacked on the first circuit board, in which the light modulation unit is stacked on the second circuit board.

In order to accomplish the above-mentioned object, a spatial light modulator device according to the present technology includes a light modulation unit, a first memory, and a second memory.

The light modulation unit may perform a transition operation between a first state and a second state.

In the first memory, data for specifying which one state of the first state and the second state the light modulation unit is to be put in may be written.

In the second memory, the data retained in the first memory may be written and the second memory may supply the data to the light modulation unit.

In order to accomplish the above-mentioned object, a spatial light modulator system according to the present technology includes a plurality of spatial light modulator devices, a signal control unit, a scan control unit, and a drive control unit.

The plurality of spatial light modulator devices each includes a light modulation unit that performs a transition operation between a first state and a second state, a first memory in which data for specifying which one state of the first state and the second state the light modulation unit is to be put in is written during a transition time in which the transition operation is performed, and a second memory in which the data retained in the first memory is written after the transition time ends and which supplies the data to the light modulation unit.

The signal control unit is connected to the first memory and supplies the data to the first memory.

The scan control unit is connected to the first memory and writes the data supplied from the signal control unit in the first memory.

The drive control unit is connected to the second memory and writes the data written in the first memory in the second memory.

The signal control unit and the scan control unit may perform writing of the data in the first memory during the transition time, and the drive control unit may write the data in the second memory from the first memory after the transition time ends.

The drive control unit may perform writing of the data in the second memory from the first memory collectively for all the plurality of spatial light modulator devices.

The drive control unit may perform writing of the data in the second memory from the first memory for each of the plurality of spatial light modulator devices.

In order to accomplish the above-mentioned object, a display apparatus according to the present technology includes a spatial light modulator system, a light source, and a control unit.

The spatial light modulator system includes a plurality of spatial light modulator devices each including a light modulation unit that performs a transition operation between a first state and a second state, a first memory in which data for specifying which one state of the first state and the second state the light modulation unit is to be put in is written during a transition time in which the transition operation is performed, and a second memory in which the data retained in the first memory is written after the transition time ends and which supplies the data to the light modulation unit, a signal control unit which is connected to the first memory and supplies the data to the first memory, a scan control unit which is connected to the first memory and writes the data supplied from the signal control unit in the first memory, and a drive control unit which is connected to the second memory and writes the data written in the first memory in the second memory.

The light source generates light incident on the spatial light modulator device.

The control unit controls the light source and the spatial light modulator system on the basis of an image signal.

MODE(S) FOR CARRYING OUT THE INVENTION

A display apparatus according to an embodiment of the present technology will be described.

[Overall Configuration of Display Apparatus]

Figure 1:
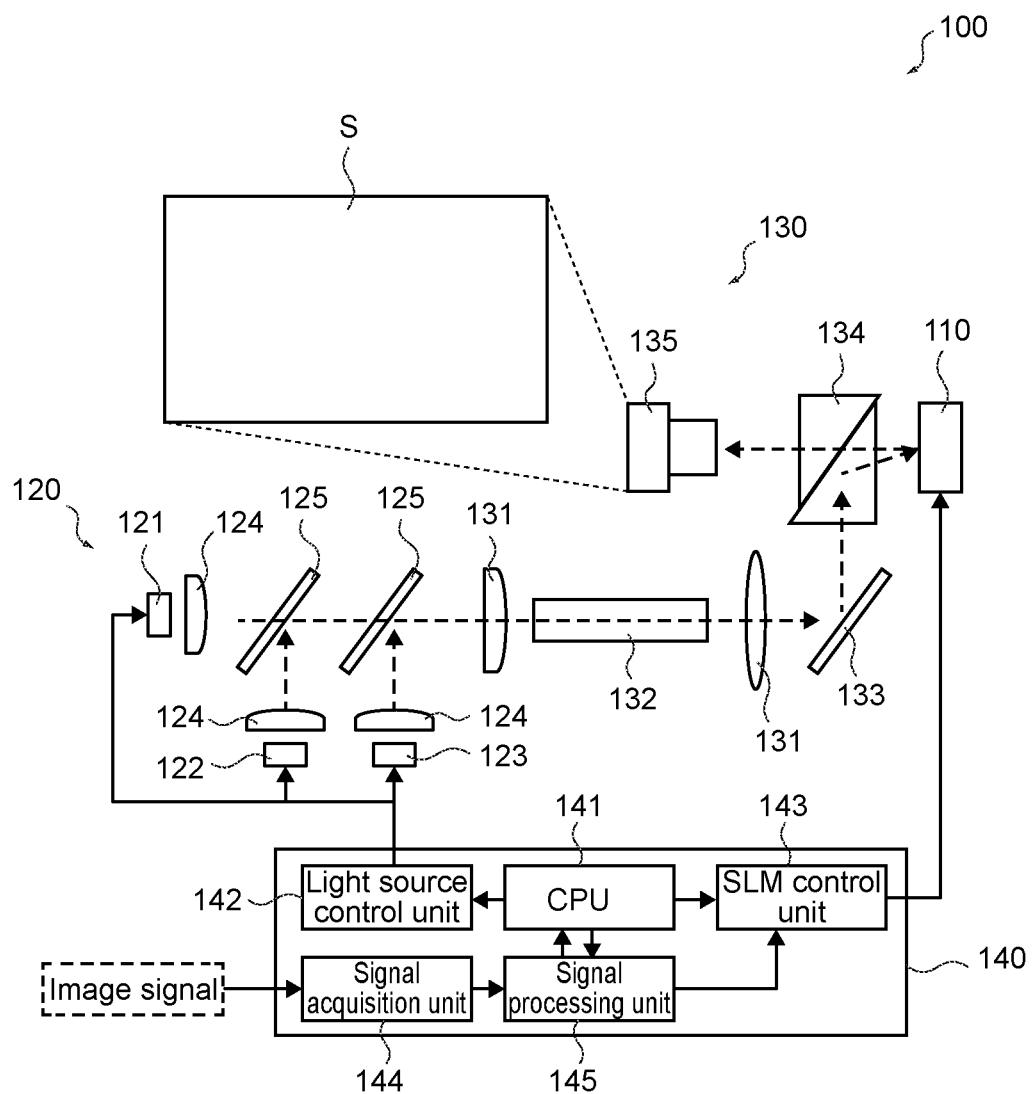
[FIG. 1] A schematic diagram of a display apparatus according to an embodiment of the present technology.

FIG. 1 is a schematic diagram of a display apparatus 100 according to this embodiment. As shown in the figure, the display apparatus 100 includes a spatial light modulator system 110, a light source unit 120, an optical system 130, and a control unit 140.

The spatial light modulator (SLM) system 110 includes a spatial light modulator device, and reflects incident light and generates an image. The details of the spatial light modulator system (hereinafter, SLM system) 110 will be described later.

The light source unit 120 includes a blue light source 121, a green light source 122, a red light source 123, a lens 124, and a dichroic mirror 125, and emits blue light, green light, and red light at different timings to enter the optical system 130.

The optical system 130 includes a lens 131, a rod integrator 132, a mirror 133, a total internal reflection (TIR) prism 134, and a projection lens 135. The optical system 130 causes the light emitted from the light source unit 120 to enter the SLM system 110 and projects light reflected from the SLM system 110 on a screen S.

The control unit 140 includes a central processing unit (CPU) 141, a light source control unit 142, an SLM control unit 143, a signal acquisition unit 144, and a signal processing unit 145. In a case where the signal acquisition unit 144 acquires an image signal, the signal processing unit 145 performs signal processing and the control unit 140 controls the light source unit 120 and the SLM system 110 to generate an image.

Specifically, the light source control unit 142 causes the blue light source 121, the green light source 122, and the red light source 123 to emit light at predetermined timings. The SLM control unit 143 sends image data to the SLM system 110 in synchronization with each light source.

The display apparatus 100 has the configuration as described above. The light (blue light, green light, and red light) emitted from the light source unit 120 is made uniform by the rod integrator 132 and enters the SLM system 110 via the mirror 133 and the total internal reflection prism 134.

The incident light of each color is reflected to be a predetermined image by the SLM system 110 and is projected onto the screen S by the projection lens 135. The images of the respective colors are successively projected on the screen S, and the human eyes perceive the images of the respective colors in an overlapping manner and recognizes them as a color image.

[SLM System Having Conventional Structure]

Before describing the SLM system 110 according to this embodiment, problems of an SLM system having the conventional structure will be described.

Figure 2:
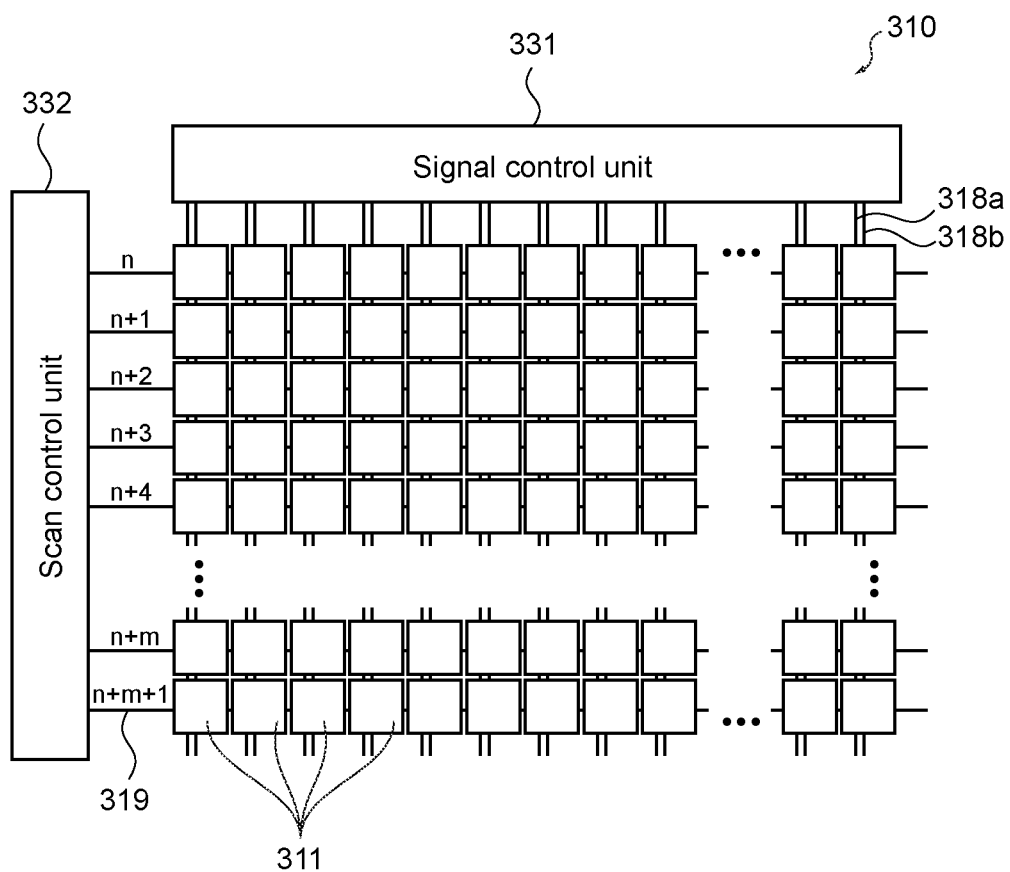
[FIG. 2] A schematic diagram of a spatial light modulator system having a conventional configuration.

FIG. 2 is a schematic diagram showing a configuration of an SLM system 310 having the conventional structure. As shown in the figure, the SLM system 310 includes a plurality of SLM devices 311 in an array, a signal control unit 331, and a scan control unit 332.

Figure 3:
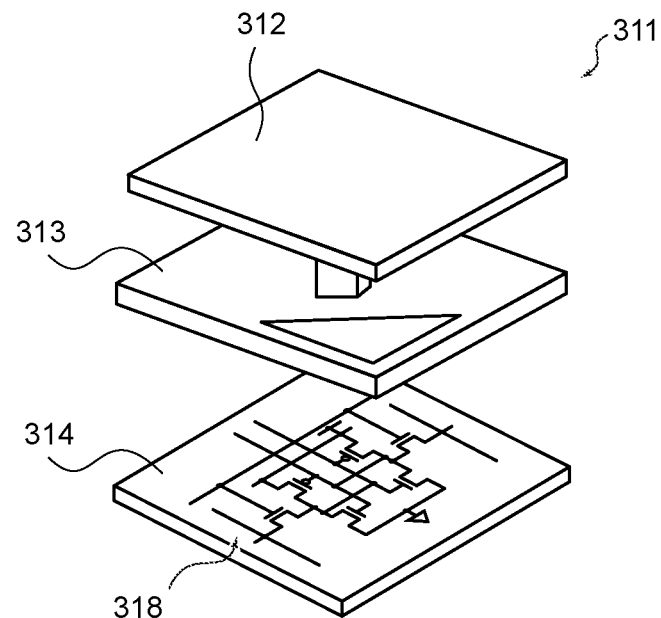
[FIG. 3] Aschematic diagram of a spatial light modulator device of the spatial light modulator system.
Figure 4:
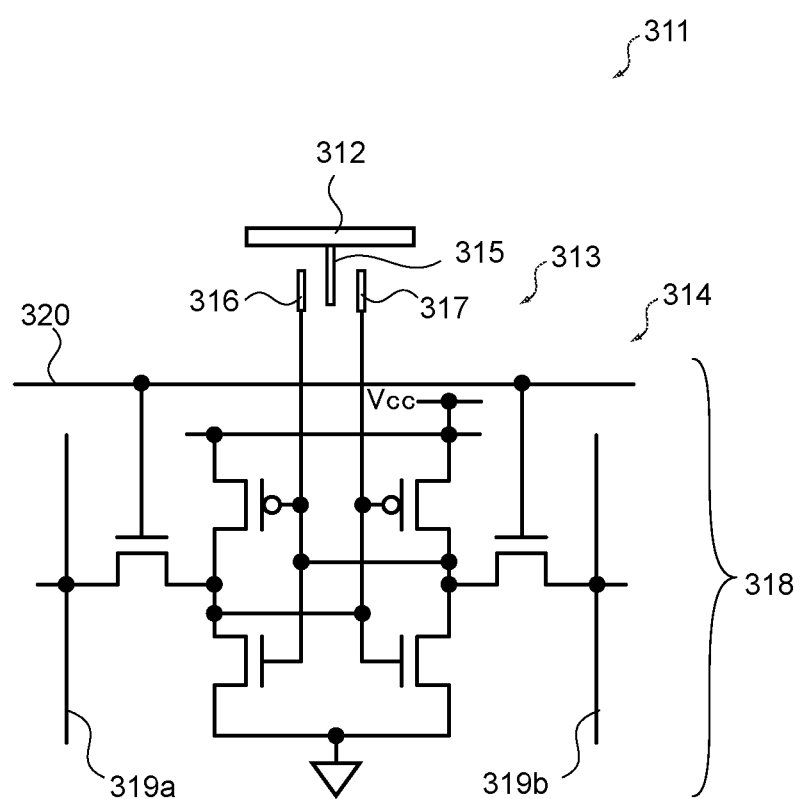
[FIG. 4] A schematic diagram showing a circuit configuration of the spatial light modulator device.

FIG. 3 is a schematic diagram showing the SLM device 311 and FIG. 4 is a schematic diagram showing a circuit structure of the SLM device 311. As shown in these figures, the SLM device 311 includes a light reflector 312, a drive mechanism 313, and a circuit board 314.

The light reflector 312 is a mirror that reflects incident light and includes a mirror electrode 315. The light reflector 312 is inclinably supported by the drive mechanism 313.

The drive mechanism 313 is configured by a micro electro mechanical system (MEMS) and the like and includes a first address electrode 316 and a second address electrode 317.

The circuit board 314 is a board on which a pixel circuit including a memory 318 is formed and the pixel circuit is electrically connected to the first address electrode 316 and the second address electrode 317. The memory 318 is constituted by a static random access memory (SRAM) as shown in FIG. 4. Alternatively, the memory 318 may be a dynamic random access memory (DRAM).

A first bit line 319a, a second bit line 319b, and a word line 320 are connected to the memory 318. As shown in FIG. 2, the first bit line 319a and the second bit line 319b connect the plurality of SLM devices 311 arranged in a column direction (up-and-down direction in Figure) and is connected to the signal control unit 331. The word line 320 connect the plurality of SLM devices 311 arranged in a row direction (left-and-right direction in the figure) and is connected to a scan control unit 332.

In each of the SLM devices 311, the signal "1" is supplied to one of the first bit line 319a and the second bit line 319b from the signal control unit 331 and the signal (hereinafter, bit signal) "0" is supplied to the other.

In a case where a signal (hereinafter, word signal) is supplied from the scan control unit 332 to the word line 320 in this state, electric charge of the bit signal is retained in the memory 318, i.e., data is written to the memory 318. The first address electrode 316 and the second address electrode 317 are connected to the memory 318, and the electric charge retained in the memory 318 is supplied thereto.

Accordingly, one of the first address electrode 316 and the second address electrode 317 has a predetermined potential and the other has a ground potential in accordance with designation by data. That is, the potentials of the first address electrode 316 and the second address electrode 317 are determined.

When a predetermined potential is applied to the mirror electrode 315 in this state, electrostatic attraction due to a potential difference is generated between the first address electrode 316 and the second address electrode 317 and the mirror electrode 315, and the light reflector 312 is inclined in one direction. Then, the light reflector 312 is in a stable state.

In a case of inclining the light reflector 312 in an opposite direction, the potentials of the first address electrode 316 and the second address electrode 317 are set to opposite potentials, and the potential of the mirror electrode 315 is changed into the predetermined potential.

A state in which the light reflector 312 is inclined in a direction to reflect the incident light toward the total internal reflection prism is defined as an ON state (bright state) and a state in which the incident light is inclined in a direction not to reflect the incident light toward the total internal reflection prism is defined as an OFF state (dark state). Further, a state in which the light reflector 312 is not inclined is defined as a flat state.

As described above, the light reflector 312 transitions from the ON state to the OFF state or transitions from the OFF state to the ON state due to the potential difference between the first address electrode 316 and the second address electrode 317 and the mirror electrode 315.

In the entire array of the SLM devices 311 (see FIG. 2), a bit signal is supplied from the signal control unit 331 through the first bit line 319a and the second bit line 319b for each column of the SLM devices 311.

When in a case where a word signal is supplied from the scan control unit 332 to the SLM device 311 of a specific row via the word line 320 in this state, data is written in the memory 318 in each SLM device 311 of the row and the potentials of the first address electrode 316 and the second address electrode 317 are determined.

Subsequently, a bit signal is supplied to the SLM device 311 of the next row, and data is written in the memory 318 by the word signal, and the potentials of the first address electrode 316 and the second address electrode 317 are determined. Hereinafter, the potentials of the first address electrode 316 and the second address electrode 317 are sequentially determined for each row of the SLM devices 311 in each row.

When the potentials of the first address electrodes 316 and the second address electrodes 317 are determined for all the SLM devices 311, the potentials are supplied to the mirror electrodes 315 of all the SLM devices 311. Accordingly, each SLM device 311 transitions to the ON state or the OFF state in accordance with the potentials of the first address electrode 316 and the second address electrode 317.

Figure 5:
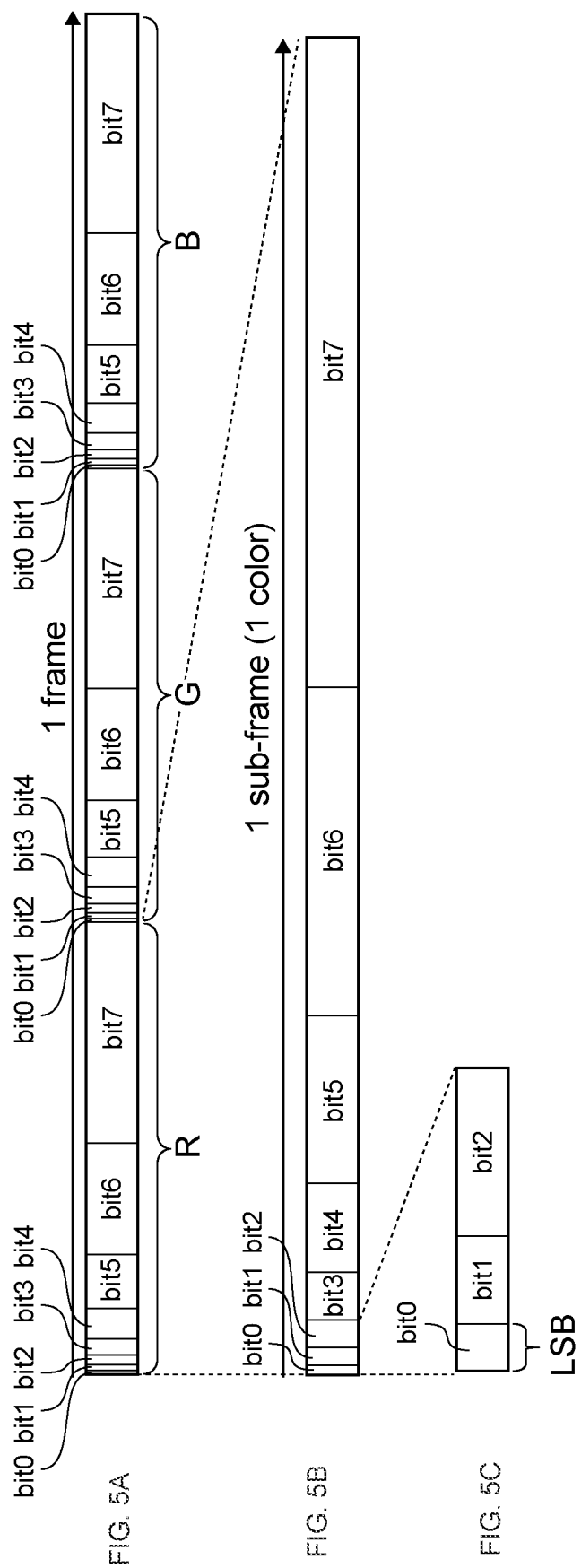
[FIGS. 5A, 5B, and 5C] Schematic diagrams showing a PWM control method in the spatial light modulator system.

Next, a control method for the SLM system 310 will be described. FIGS. 5A and 5B are schematic diagrams showing the control method for the SLM system 310 by the pulse width modulation (PWM) technique, in which the horizontal axis represents time.

As shown in FIG. 5A, one frame of an image includes light emission times of red (R in the figure), green (G in the figure), and blue (B in the figure). The red light emission time is a time in which the red light source (see FIG. 1) is emitting, the green light emission time is a time in which the green light source is emitting, and the blue light emission time is a time in which the blue light source is emitting.

FIG. 5B shows a sub-frame in the red light emission time and FIG. 5C shows a part of FIG. 5B in an enlarged state. As shown in these figures, the red light emission time includes 8 levels of bit intensity from bit 0 to bit 7.

In each pixel (one SLM device 311), the gradation of red can be determined by selecting a bit to be put in the ON state in accordance with desired gradation. Similarly, in the case of green and blue, desired gradation can be obtained by selecting a bit to be put in the ON state.

When the SLM device 311 is controlled to have desired gradation of red, blue, and green, light reflected by the SLM device 311 is overlapped to form a pixel in a predetermined color on the screen.

It should be noted that although the case of the 8-levels of bit intensity has been described here, the bit intensity is not limited to the 8 levels and may be more or less.

As shown in FIG. 5C, the least significant bit (bit 0 in the figure) is called least significant bit (LSB) time, and is the minimum update interval in the SLM device 311, i.e., a time from the transition of the SLM device 311 to the next transition.

Figure 6:
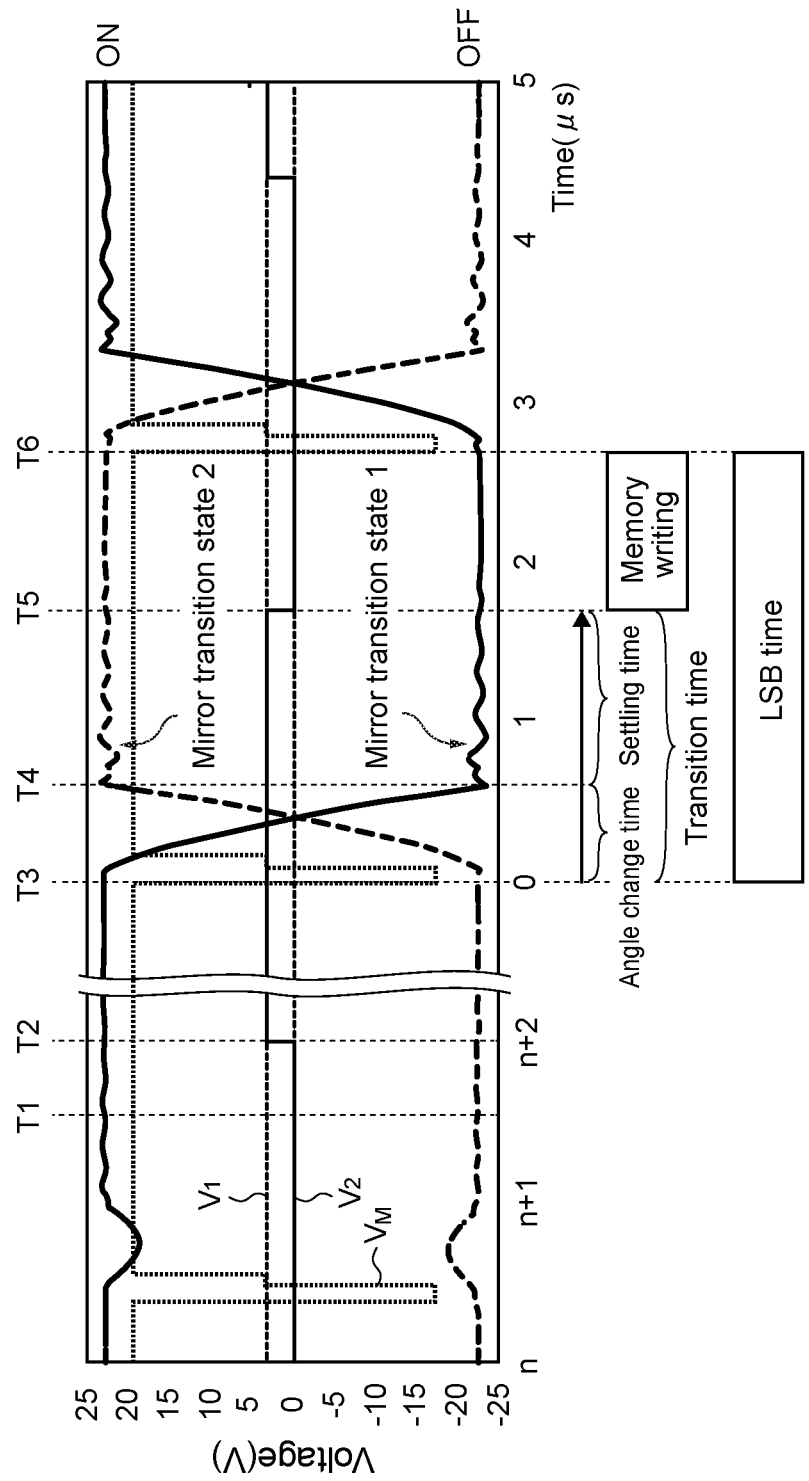
[FIG. 6] A schematic diagram showing a control method associated with a transition operation in the spatial light modulator device.

FIG. 6 is a graph showing a control method for the SLM device. In this figure, the potential of the first address electrode 316 (see FIG. 4) is shown as a first address potential $V_1$, the potential of the second address electrode 317 is shown as a second address potential $V_2$, and the potential of the mirror electrode 315 is shown as a mirror potential $V_M$.

Further, the transition state of the SLM device 311 (angle of the light reflector 312 with respect to the flat state) is shown as a "mirror transition state 1" and a "mirror transition state 2". Hereinafter, the mirror transition state 1 will be described. As shown in the figure, in the mirror transition state 1, the light reflector 312 transitions from the ON state to the OFF state, and further transitions to the ON state.

As shown in the figure, at a time T1, the SLM device 311 is in the ON state. At this time, the first address potential $V_1$ is higher than the second address potential $V_2$.

At a time T2, when a word signal is supplied, data is written in the memory 318 and the first address electrode 316 and the second address electrode 317 are determined. Accordingly, as shown in the figure, the first address potential $V_1$ and the second address potential $V_2$ are reversed.

Subsequently, at a time T3, the mirror potential $V_M$ is instantaneously changed to a predetermined potential. Then, the light reflector 312 transitions from the ON state to the OFF state in accordance with a potential difference between the mirror potential $V_M$ and the first address potential $V_1$ and a potential difference between the mirror potential $V_M$ and the second address potential $V_2$.

In this figure, between the time T3 and the time T4, the light reflector 312 transitions from the ON state to the OFF state. Since the transition of the light reflector 312 is a mechanical angle change of the light reflector 312 as described above, the light reflector 312 causes vibrations after the transition.

Hereinafter, a time for changing the angle of the light reflector 312, i.e., a time from the time T3 to the time T4 will be referred to as an "angle change time" and a time until the vibrations of the light reflector 312 converge and settle, i.e., a time from the time T4 to the time T5 will be referred to as a "settling time". The sum of the angle change time and the settling time, i.e., the time T3 to the time T5 will be referred to as a "transition time".

It should be noted that even if the light reflector 312 maintains the ON state or the OFF state, the light reflector 312 is once put in the flat state when the mirror potential $V_M$ changes, and then returns to the original angle. Vibrations are caused in the light reflector 312 at that time. Therefore, even if the light reflector 312 maintains the ON state or the OFF state, the angle change time and the settling time are necessary when the mirror potential $V_M$ changes.

After the transition time, a word signal is supplied at the time T5, data is written in the memory 318, and the first address potential $V_1$ and the second address potential $V_2$ are reversed again.

Then, from the time T5 to the time T6, data is written (in the figure, "memory writing") in the memory 318 of the SLM device 311 of another row. For example, in a case where the SLM device 311 has 768 rows, a time to complete writing for 768 lines is necessary.

In a case where the writing of data is completed at the time T6, the mirror potential $V_M$ is instantaneously changed to the predetermined potential and the light reflector 312 is made to transition from the OFF state to the ON state again. After changing the mirror potential $V_M$, a time until the next change of the mirror potential $V_M$, i.e., a time from the time T3 to the time T6 is equivalent to a shortest time that can be realized as the LSB.

Here, during the transition time, writing of the bit signal in the memory 318 (in the figure, "memory writing") cannot be executed.

It is because since mechanical vibrations are caused in the light reflector 312 between the time T4 and the time T5, if the bit signal is written and the address voltage is changed at this time, the light reflector 312 becomes unstable. Therefore, the LSB time is the sum of the transition time and the data writing time, and further reduction is difficult.

In a case where the LSB time is longer, one frame is also longer, and the above-mentioned single color image is not synthesized, and there is a possibility that "color breakup" in which the images of the respective colors are seen separately may occur or image flicker. In particular, further shortening of the LSB time is required in a case of increasing the number of gradation levels (increasing the bit intensity shown in FIGS. 5A and 5B from the 8 levels) or in a case of increasing the number of pixels (number of SLM devices 311).

In this context, the present technology shown below can reduce the LSB time.

It should be noted that the LSB time in the SLM device 311 is, for example, about 21.78 ρs as shown in FIGS. 5A and 5B and Equation 1 below in a case where one frame is 60 Hz, the RGB ratio is 1:1:1, and the 8-bit gradation is set.

$$\text{LSB time} = 1/(60 \text{ Hz} \times 3_{RGB} \times (2^8 - 1)) = 21.78 \text{ μs} \quad \text{(Equation 1)}$$

[Configuration of SLM System]

Figure 7:
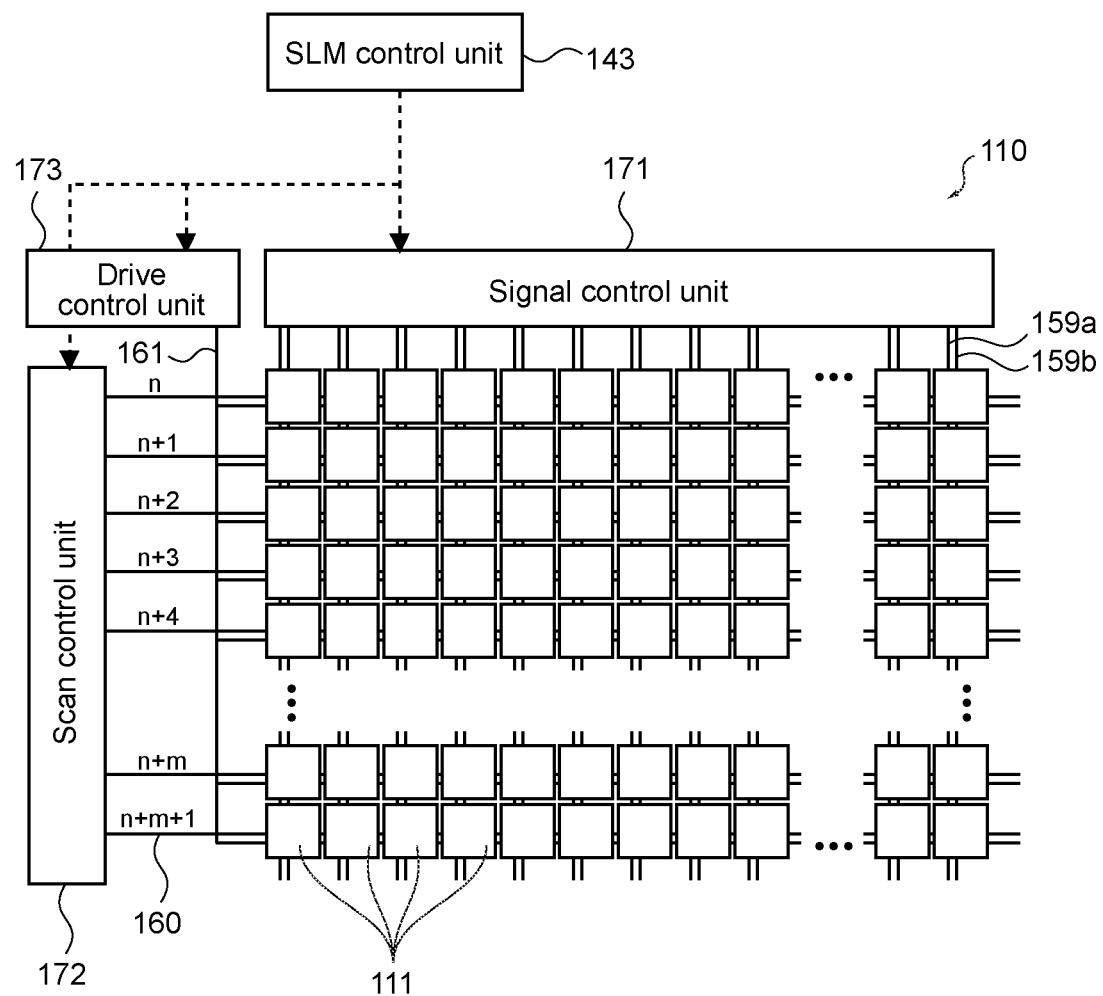
[FIG. 7] A schematic diagram of the spatial light modulator system according to the embodiment of the present technology.

The SLM system 110 (FIG. 1) according to the present technology will be described. FIG. 7 is a schematic diagram showing a configuration of the SLM system 110. As shown in the figure, the SLM system 110 includes a plurality of SLM devices 111 in an array form, a signal control unit 171, a scan control unit 172, and a drive control unit 173.

The signal control unit 171, the scan control unit 172, and the drive control unit 173 are connected to the SLM control unit 143 described above and are controlled by the SLM control unit 143. It should be noted that the signal control unit 171 and the scan control unit 172 may be connected to opposite sides of the array of the SLM devices 111.

Figure 8:
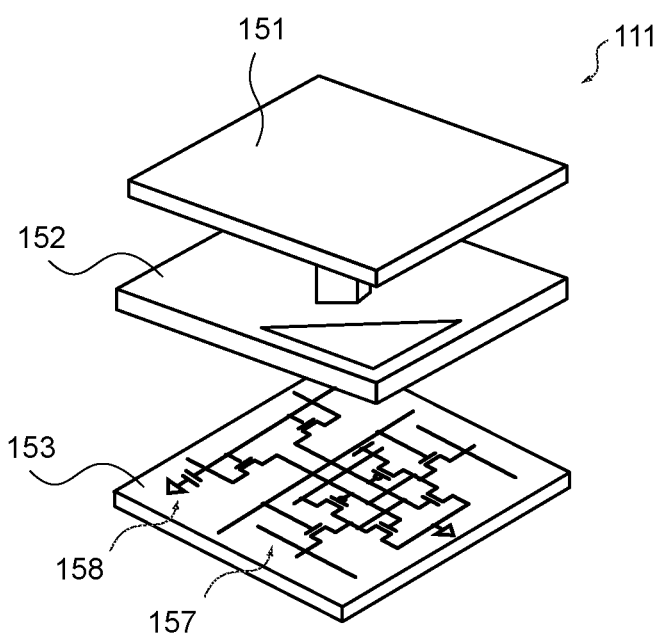
[FIG. 8] A schematic diagram of the spatial light modulator device of the spatial light modulator system.
Figure 9:
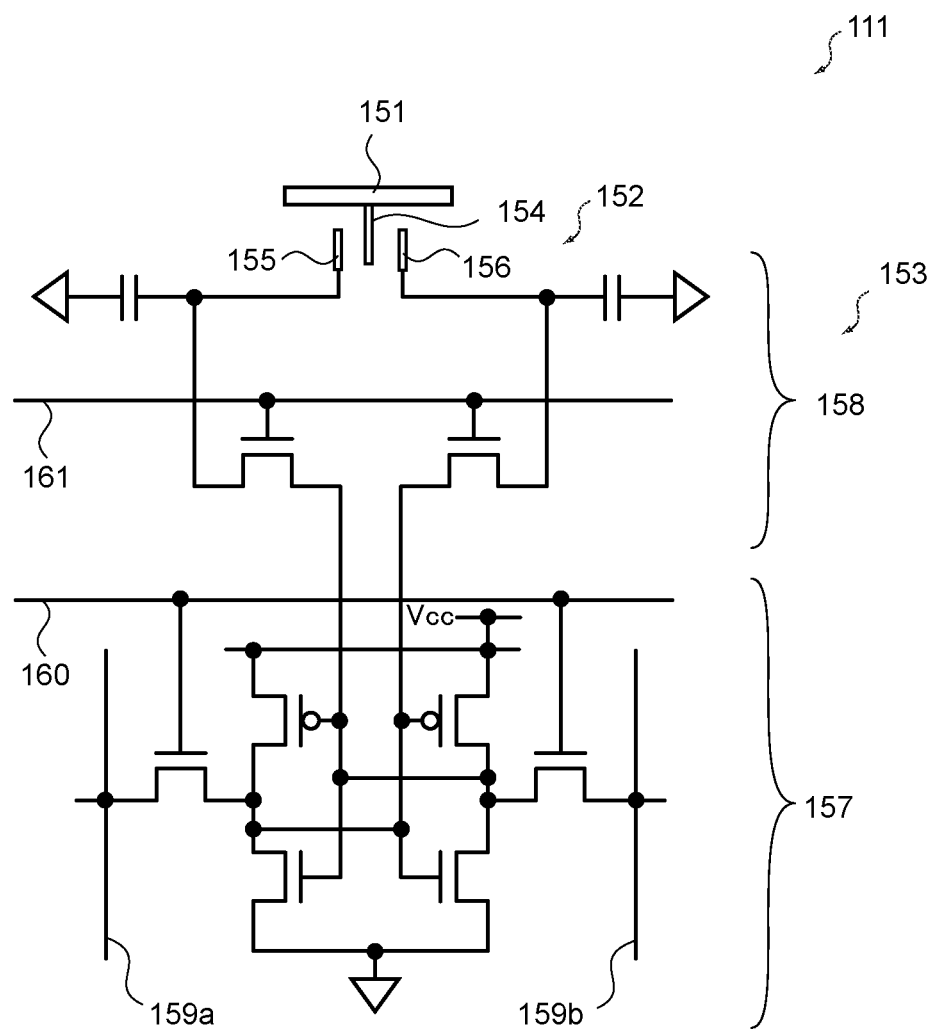
[FIG. 9] A schematic diagram showing a circuit configuration of the spatial light modulator device.

FIG. 8 is a schematic diagram showing the SLM device 111 and FIG. 9 is a schematic diagram showing a circuit structure of the SLM device 111. As shown in these figures, the SLM device 111 includes a light reflector 151, a drive mechanism 152, and a circuit board 153.

The light reflector 151 is a mirror that reflects incident light and is typically a micromirror. The light reflector 151 includes a mirror electrode 154 and is inclinably supported by the drive mechanism 152.

The drive mechanism 152 is constituted by a micro electro mechanical system (MEMS) and the like and changes the angle of the light reflector 151. The drive mechanism 152 includes a first address electrode 155 and a second address electrode 156.

A state in which the light reflector 151 is inclined at a first angle with respect to the drive mechanism 152 and inclined in a direction to reflect incident light toward the total internal reflection prism 134 (see FIG. 1) is defined as an ON state (bright state). Further, a state in which the light reflector 151 is inclined at a second angle with respect to the drive mechanism 152 and inclined in a direction not reflect the incident light toward the total internal reflection prism 134 is defined as an OFF state (dark state).

The first angle and the second angle only need to be different angles and are not particularly limited. Further, a state in which the light reflector 151 is not inclined is defined as a flat state. A light modulation unit capable of modulating the incident light by the light reflector 151 and the drive mechanism 152 is thus configured.

The circuit board 153 is a board which is stacked on the drive mechanism 152 and in which a pixel circuit including a first memory 157 and a second memory 158 has been formed.

In the first memory 157, data for specifying which of the ON state and the OFF state the light reflector 151 is to be put in is written. The first memory 157 may be constituted by a static random access memory (SRAM). A first bit line 159a, a second bit line 159b, and a first word line 160 are connected to the first memory 157.

As shown in FIG. 7, the first bit line 159a and the second bit line 159b connect the plurality of SLM devices 111 arranged in a column direction (up-and-down direction in the figure) and are connected to the signal control unit 171. The first word line 160 connects the plurality of SLM devices 111 arranged in a row direction (left-and-right direction in the figure) and is connected to the scan control unit 172.

Data retained in the first memory 157 is written in the second memory 158 and the second memory 158 supplies the data to the drive mechanism 152. The second memory 158 may be constituted by a dynamic random access memory (DRAM).

A second word line 161 is connected to the second memory 158. The second word line 161 is, for example, a wire connected to a gate electrode of the DRAM. The second word line 161 connects the plurality of SLM devices 111 arranged in the row direction (left-and-right direction in the figure) and is connected to the drive control unit 173.

[Operation of SLM System]

An operation of the SLM system 110 will be described. The signal control unit 171, the scan control unit 172, and the drive control unit 173 described above supplies a signal to each SLM device 111 (see FIG. 7).

The signal control unit 171 is connected to the first memory 157 and supplies data to the first memory 157. The scan control unit 172 is connected to the first memory 157 and writes the data supplied from the signal control unit 171 in the first memory. The drive control unit 173 is connected to the second memory 158 and writes the data written in the first memory 157 in the second memory 158.

As shown in FIG. 9, in each of the SLM devices 111, the signal "1" is supplied to one of the first bit line 159a and the second bit line 159b from the signal control unit 171 and the signal (hereinafter, bit signal) "0" is supplied to the other.

When a signal (hereinafter, first word signal) is supplied from the scan control unit 172 to the first word line 160 in this state, charge of the bit signal is retained in the first memory 157, i.e., data is written in the first memory 157.

In addition, when a signal (hereinafter, second word signal) is supplied from the drive control unit 173 to the second word line 161, the data stored in the first memory 157 is written in the second memory 158 and one of the first address electrode 155 and the second address electrode 156 has a predetermined potential and the other has a ground potential. That is, the potentials of the first address electrode 155 and the second address electrode 156 are determined in accordance with the data stored in the first memory 157.

When a predetermined potential is applied to the mirror electrode 154 in this state, electrostatic attraction due to a potential difference is generated between the first address electrode 155 and the second address electrode 156 and the mirror electrode 154, and the light reflector 151 is inclined at either one of the first angle and the second angle. Then, the light reflector 151 is in a stable state.

In a case of inclining the light reflector 151 in an opposite direction, the potentials of the first address electrode 155 and the second address electrode 156 are set to opposite potentials, and the potential of the mirror electrode 154 is changed into the predetermined potential.

As described above, the light reflector 151 transitions from the ON state to the OFF state or transitions from the OFF state to the ON state due to the potential difference between the first address electrode 155 and the second address electrode 156 and the mirror electrode 154.

It should be noted that when the second word signal is supplied to the second word line 161 and the data is moved from the first memory 157 to the second memory 158, the first memory 157 enters a state in which the first memory 157 does not need to store the data. Therefore, data for the next transition can be written in the first memory 157 after the data transfer.

Figure 10:
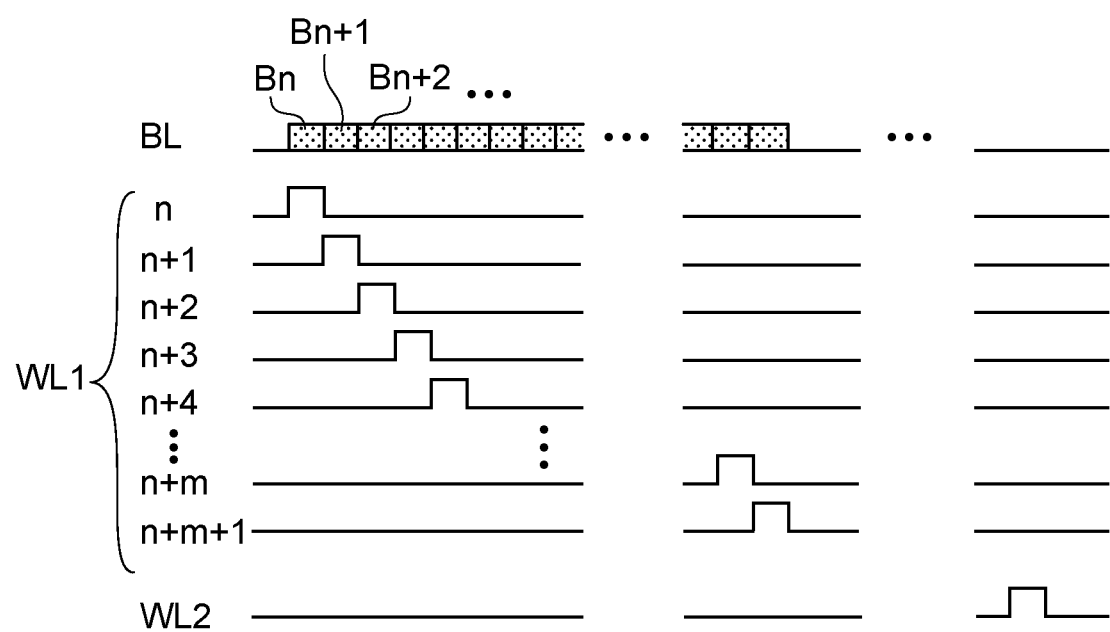
[FIG. 10] A schematic diagram showing control waveforms in the spatial light modulator system.

Next, an operation of the entire array of the SLM devices 111 (see FIG. 7) will be described. FIG. 10 is a schematic diagram showing control waveforms in the SLM systems 110.

In the SLM systems 110, data is written for each row of the SLM devices 111. As indicated by "BL" in FIG. 10, the signal control unit 171 supplies a bit signal to the SLM devices 111 in each row via the first bit line 159a and the second bit line 159b. It should be noted that "Bn" in this figure indicates that a bit signal is supplied to each SLM device 111 in an n-th row.

As indicated by "WL1" in FIG. 10, the scan control unit 172 supplies a first word signal to each SLM device 111 via the first word line 160 for each row. In this figure, "n" indicates that the first word signal is supplied to each SLM device 111 in the n-th row.

The scan control unit 172 supplies the first word signal to each SLM device 111 of the n-th row while the bit signal is supplied to each SLM device 111 of the n-th row from the signal control unit 171 ("Bn" in the figure). Accordingly, data is written in the first memory 157 in each SLM device 111 of the n-th row.

Similarly, the scan control unit 172 supplies the first word signal to each SLM device 111 in a (n+1)-th row while the bit signal is supplied to each SLM device 111 in the (n+1)-th row ("Bn+1" in the figure), and writes data in the first memory 157 in each SLM device 111 in the (n+1)-th row.

When the writing of the data is completed in the SLM devices 111 in all the rows, the drive control unit 173 supplies the second word signal to all the SLM devices 111 ("WL2" in the figure). Accordingly, data is written in the second memory 158 from the first memory 157 in all the SLM devices 111, and the potentials of the first address electrode 155 and the second address electrode 156 are determined.

Next, a control method for the SLM device 111 will be described. It should be noted that the gradation control method based on the PWM technique is similar to the conventional one (see FIGS. 5A and 5B), it is possible to further shorten the LSB time in the SLM device 111.

Figure 11:
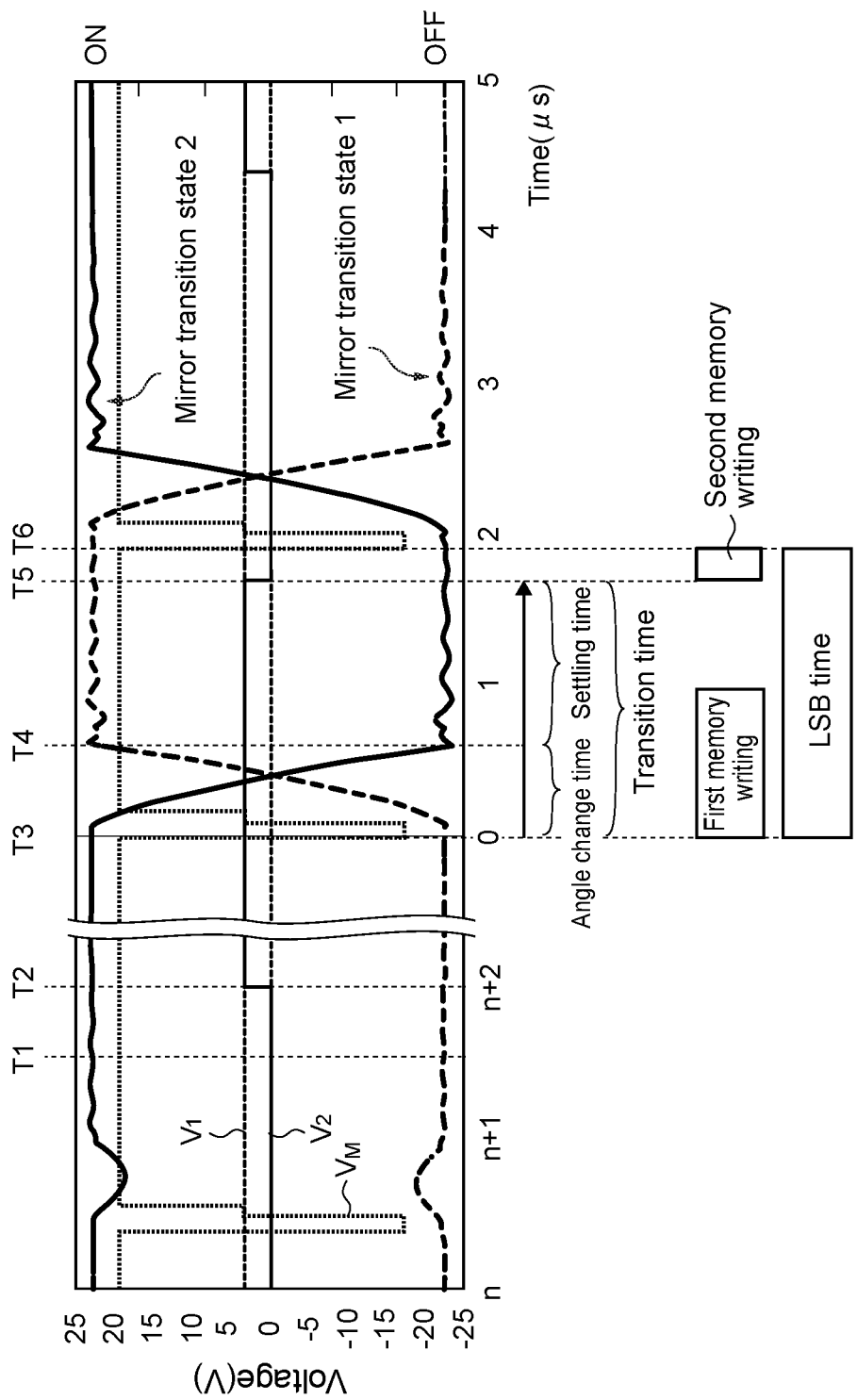
[FIG. 11] A schematic diagram showing a control method associated with the transition operation in the spatial light modulator device.

FIG. 11 is a graph showing the control method for the SLM device 111. In this figure, the potential of the first address electrode 155 (see FIG. 9) is shown as the first address potential $V_1$, the potential of the second address electrode 156 is shown as the second address potential $V_2$, and the potential of the mirror electrode 154 is shown as the mirror potential $V_M$.

Further, the transition state of the SLM device 111 (angle of the light reflector 151 with respect to the flat state) is shown as a "mirror transition state 1" and a "mirror transition state 2". Hereinafter, the mirror transition state 1 will be described. As shown in the figure, in the mirror transition state 1, the light reflector 151 transitions from the ON state to the OFF state and further transitions to the ON state.

As shown in the figure, at the time T1, the SLM device 111 is in the ON state. At this time, the first address potential $V_1$ is higher than the second address potential $V_2$.

At the time T2, when the second word signal is supplied, data is written in the second memory 158 from the first memory 157 and the first address potential $V_1$ and the second address potential $V_2$ are reversed.

Subsequently, at the time T3, the mirror potential $V_M$ is instantaneously changed to a predetermined potential. Then, the light reflector 151 transitions from the ON state to the OFF state in accordance with the potential difference between the mirror potential $V_M$ and the first address potential $V_1$ and the potential difference between the mirror potential $V_M$ and the second address potential $V_2$.

In this figure, between the time T3 and the time T4, the light reflector 151 transitions from the ON state to the OFF state. Since the transition of the light reflector 151 is a mechanical angle change of the light reflector 151 as described above, the light reflector 151 causes vibrations after the transition.

Hereinafter, the time for changing the angle of the light reflector 151, i.e., the time from the time T3 to the time T4 will be referred to as an "angle change time", and the time until the vibrations of the light reflector 151 converge and settle, i.e., the time from the time T4 to the time T5 will be referred to as a "settling time". The sum of the angle change time and the settling time, i.e., the time T3 to the time T5 will be referred to as a "transition time".

It should be noted that even if the light reflector 151 is maintained in the ON state or the OFF state, the light reflector 151 is once put in the flat state when the mirror potential $V_M$ changes, and then returns to the original angle. In this case, vibrations are caused in the light reflector 151. Therefore, even if the light reflector 151 is maintained in the ON state or the OFF state, the angle change time and the settling time occur when the mirror potential $V_M$ changes.

At the same time, data for the next transition (transition from the time T6) is written in the first memory 157 of each SLM device 111 ("first memory writing" in the figure) between the time T3 and the time T4. Here, as shown in FIG. 10, in a case where data is written to each row of the SLM device 111 and the SLM device 311 has 768 rows, for example, the writing for the 768 rows is completed.

Unlike the SLM device 311 having the conventional structure (see FIG. 6), the data writing in the first memory 157 can be performed even during the transition time of the light reflector 151 (between the time T3 and the time T5). It is because the potentials of the first address potential $V_1$ and the second address potential $V_2$ are retained by the second memory 158 and the writing in the first memory 157 does not affect the first address potential $V_1$ and the second address potential $V_2$.

Next, after the light reflector 151 settles, a second word signal is supplied at the time T5 and data is written in the second memory 158 from the first memory 157. This writing can be performed collectively for all the SLM devices 111. Accordingly, the first address potential $V_1$ and the second address potential $V_2$ are updated and reversed again.

When updating of the first address potential $V_1$ and the second address potential $V_2$ is completed at the time T6, the mirror potential $V_M$ is instantaneously changed to a predetermined potential and the light reflector 151 is changed from the OFF state to the ON state. After changing the mirror potential $V_M$, a time until the next change of the mirror potential $V_M$, i.e., a time from the time T3 to the time T6 is equivalent to the shortest time that can be realized as the LSB.

The SLM system 110 performs the operation as described above. As shown in FIG. 6, in the SLM system 310 of the conventional structure, it has been difficult to shorten the LSB time because data cannot be written in the memory 318 during the transition time of the light reflector 312.

In contrast, in the SLM system 110 according to the present technology, data can be written in the first memory 157 during the transition time as shown in FIG. 11. Accordingly, the LSB time can be shortened in the SLM system 110.

In addition, in the SLM system 310 having the conventional structure, as the number of pixels (number of SLM devices 311) increases, the data writing time ("memory writing" in FIG. 6) increases, which in turn increases the LSB time.

On the other hand, the number of pixels can be easily increased in the SLM system 110 because the LSB time does not increase ("second memory writing" is simultaneous for all the pixels) even if the number of pixels increases and the data writing time (in FIG. 11, "first memory writing") increases.

[Effects of SLM System]

As described above, the SLM system 110 can shorten the LSB time and more finely control the PWM. Accordingly, it is possible to increase the number of PWM bits, i.e., to achieve higher gradation (higher bit depth), and it is possible to improve the display image quality.

Further, along with the higher gradation, it becomes possible to more finely control the y characteristic representing the gradation-luminance characteristics. Accordingly, it is possible to improve noise and black clipping when displaying low gradation, which is a problem in binary devices such as micromirror devices.

Further, along with the reduction of the minimum update interval (LSB time), it is possible to subdivide the PWM, and it is possible to suppress the occurrence of pseudo-contours, which is a problem in binary devices such as micromirror devices.

Further, since the reduction of the LSB time can reduce the total gradation time (in FIGS. 5A and 5B, one frame) in the PWM control, a high frame rate can be realized, and it is possible to improve smoothness and suppress flickering and the like when displaying a moving image. Further, it is possible to suppress color break during field sequential color control (sequential emission of respective color light rays shown in FIGS. 5A and 5B).

In addition, since the increase in the LSB time does not depend on the increase in the number of pixels, it is compatible for high resolution such as 8K.

[Other Configurations for SLM Devices]

Figure 12:
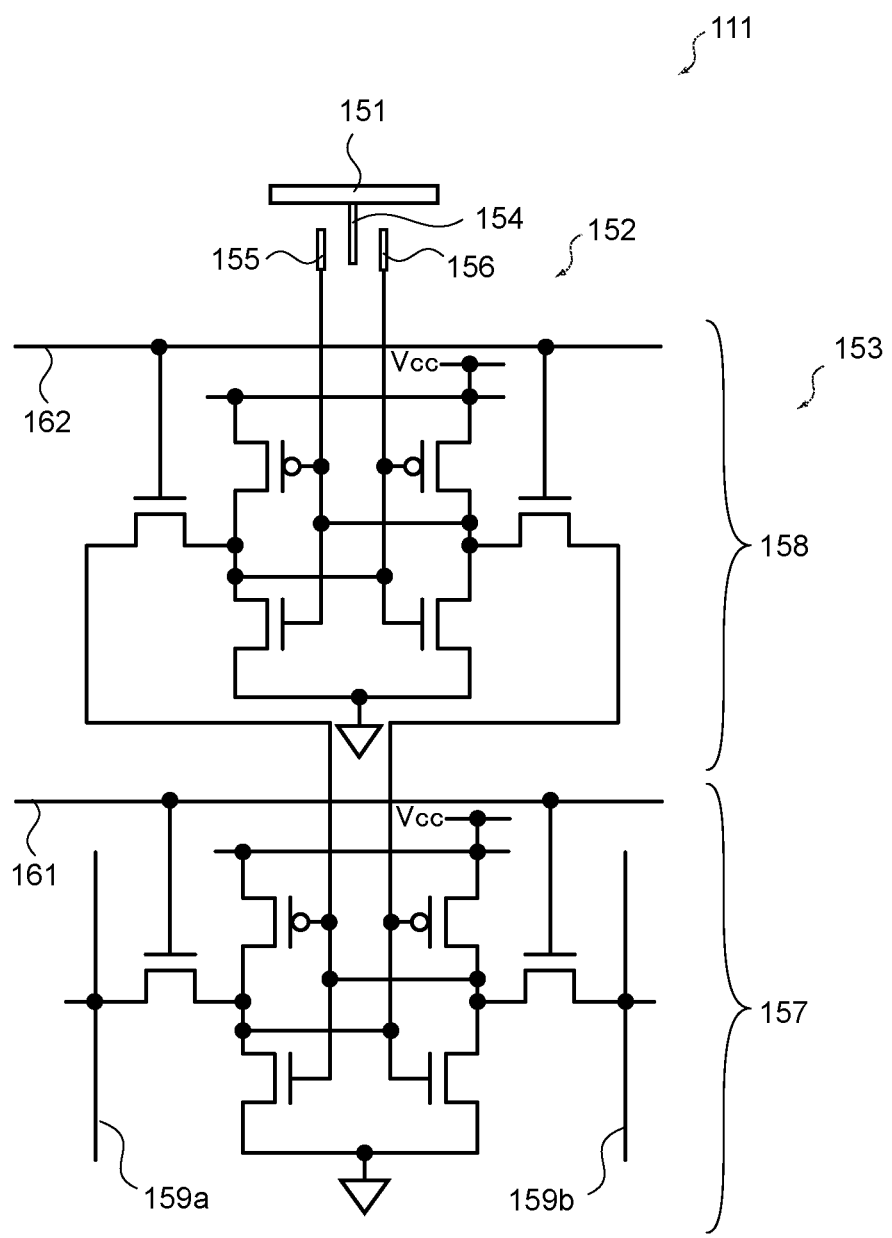
FIG. 12] A schematic diagram showing a circuit configuration of the spatial light modulator device.

The configuration of the SLM device 111 is not limited to that described above. FIG. 12 is a circuit diagram showing another configuration of the SLM device 111. As shown in the figure, both the first memory 157 and the second memory 158 may be constituted by SRAMs.

The first memory 157 may be constituted by a DRAM and the second memory 158 may be constituted by a SRAM or the first memory 157 and the second memory 158 may be both constituted by DRAMs. In either case, it is possible to realize the control method according to the present technology in accordance with the waveforms shown in FIG. 10.

In addition, the first memory 157 and the second memory 158 may be constituted by other memory elements as long as the above-mentioned operation can be realized.

Figure 13:
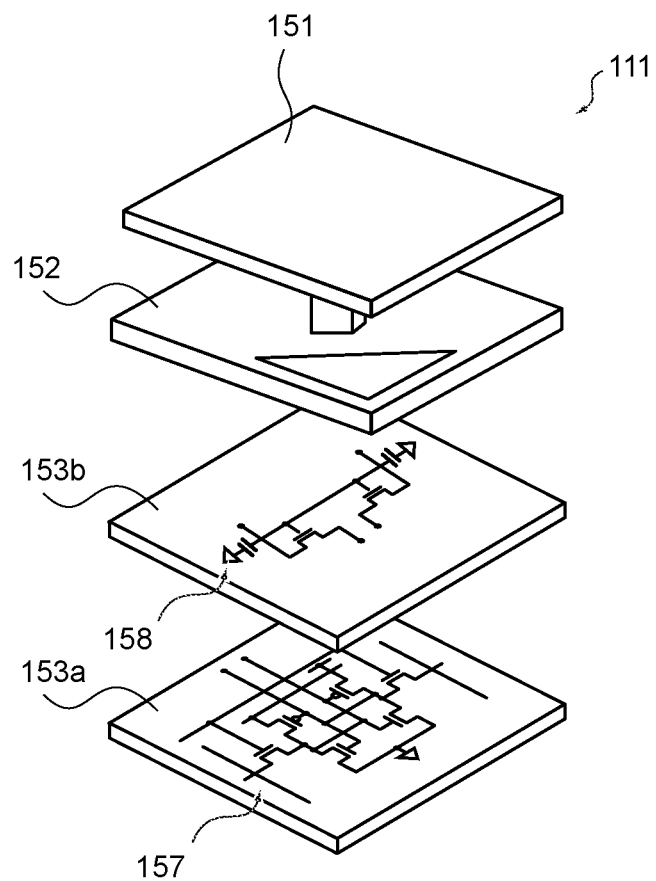
[FIG. 13] A schematic diagram of the spatial light modulator device.

Further, the implementation of the SLM device 111 may have other configurations. FIG. 13 is a perspective view showing another configuration of the SLM device 111.

As shown in the figure, the SLM device 111 may include a first circuit board 153a and a second circuit board 153b. The second circuit board 153b is laminated on the first circuit board 153a and the drive mechanism 152 is laminated on the second circuit board 153b. The first memory 157 is formed on a circuit board 153a and the second memory 158 is formed on a circuit board 153b.

As shown in FIG. 8, the first memory 157 and the second memory 158 can be mounted on one circuit board 153. However, in a case where the pixel circuit includes two memories, the area of the pixel circuit may be larger than in a case where the pixel circuit includes a single memory. Further, in accordance with the miniaturization of the light reflector 151, the area of the pixel circuit may be restricted.

As shown in FIG. 13, a configuration in which the first memory 157 and the second memory 158 are formed on different circuit boards and the two circuit boards are bonded together to join the respective electrodes can be employed. Laminating the pixel circuits can improve the degree of freedom of the circuit layout and reduce the size of the SLM device 111. Further, the manufacturing cost can be reduced due to reduction of the load of the process rule.

[Other Configurations of SLM System]

In the SLM system 110, the drive control unit 173 and the SLM device 111 are connected by the second word line 161 as described above. Here, as shown in FIG. 7, the connection between the drive control unit 173 and the SLM device 111 is not limited to the connection in which one second word line 161 connected to the drive control unit 173 is branched and connected to all the SLM devices 111.

Figure 14:
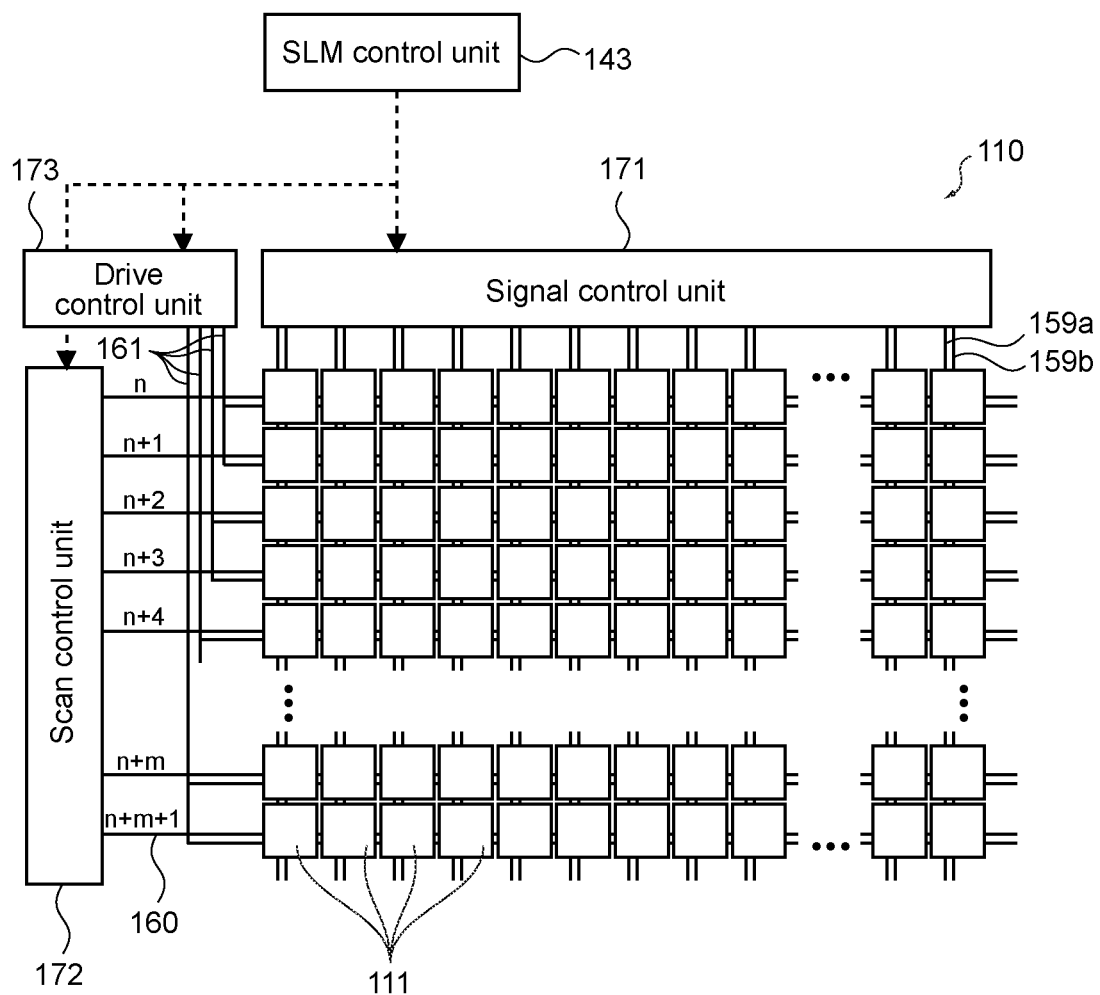
[FIG. 14] A schematic diagram of the spatial light modulator system.

FIG. 14 is a schematic diagram showing another configuration of the SLM system 110. As shown in the figure, the plurality of second word lines 161 may be connected to the drive control unit 173 and each second word line 161 may be connected to the SLM device 111 for each block of the SLM device 111.

As shown in FIG. 10, the SLM system 110 writes data in the first memory 157 for each row of the SLM device 111 ("first memory writing" in FIG. 11). When vibrations of the light reflector 151 converge (time T5 in FIG. 11), data is transferred from the first memory 157 to the second memory ("second memory writing" in FIG. 11).

However, in a case where the number of pixels (number of SLM devices) is large or the writing frequency of data is decreased in order to reduce the power consumption, writing in the first memory 157 may not be completed even after vibrations of the light reflector 151 converge.

On the other hand, in a case where the second word line 161 is connected to the SLM device 111 for each block as shown in FIG. 14, it is possible to supply the second word signal for each block of the SLM device 111. Therefore, it is possible to sequentially write data in the second memory 158 from the block where writing of data in the first memory 157 is completed.

Accordingly, the first address electrode 155 and the second address electrode 156 have potentials for the next transition, and the SLM device 111 can be made transition for each block by changing the potential of the mirror electrode 154 for each block.

By connecting the second word line 161 to the SLM device 111 for each block as described above, it is possible to prevent the LSB time from increasing even in a case where the number of pixels is large or a case where the writing frequency of data is decreased.

It should be noted that the blocks of the SLM devices 111 are not limited to those shown in FIG. 14, and it is sufficient that the plurality of SLM devices 111 is provided.

[Application Examples of SLM Device]

The SLM device 111 can be used as a light reflective device of the projection display apparatus 100 as described above. The display apparatus 100 is the single-plate display apparatus in which red, green and blue light rays sequentially enter the single micromirror, though not limited thereto. The display apparatus 100 may be a three-plate display apparatus in which the respective color light rays enter different micromirrors.

The number of light sources is also not limited to the three colors of red, green, and blue, and one or four or more colors may be used. Further, the light is also not limited to visible light and may be ultraviolet rays or the like.

Further, the SLM device 111 is not limited to the display apparatus, and can also be used for various devices using SLM devices, such as a 3D printer, a sensor, and a machine vision device. Also with either apparatus, the LSB time can be shortened, i.e., a high-speed response of the micromirror can be realized, and the tact time (processing time) in lithography or machine vision using a 3D printer or the like can be shortened.

Further, the SLM device 111 is not limited to the light reflective device, and it is possible to realize a high-speed response according to the present technology as long as it performs a transition operation for spatial light modulation.

It should be noted that the present technology may also take the following configurations.

(1) A spatial light modulator device, including:
a light modulation unit that performs a transition operation between a first state and a second state;
a first memory in which data for specifying which one state of the first state and the second state the light modulation unit is to be put in is written during a transition time in which the transition operation is performed; and
a second memory in which the data retained in the first memory is written after the transition time ends and which supplies the data to the light modulation unit.

(2) The spatial light modulator device according to (1), in which
the light modulation unit includes a light reflector that reflects incident light and a drive mechanism that changes an angle of the light reflector, and
the light reflector is inclined at a first angle in the first state and is inclined at a second angle in the second state.

(3) The spatial light modulator device according to (2), in which
the transition time is the sum of an angle change time that is a time in which the angle of the light reflector is changed and a settling time that is a time until vibrations of the light reflector converge after the change of the angle.

(4) The spatial light modulator device according to (2) or (3), in which
the drive mechanism includes an address electrode connected to the second memory and
the address electrode has a potential which is determined by the data.

(5) The spatial light modulator device according to (4), in which
the address electrode includes a first address electrode and a second address electrode and
the data determines a potential difference between the first address electrode and the second address and a reference potential.

(6) The spatial light modulator device according to (5), in which
the light reflector includes a mirror electrode that causes electrostatic attraction between the first address electrode and the second address electrode and has the first angle or the second angle due to the electrostatic attraction.

(7) The spatial light modulator device according to any one of (1) to (6), in which
the light reflector is a micromirror, and
the drive mechanism is constituted by a micro electro mechanical systems (MEMS).

(8) The spatial light modulator device according to any one of (1) to (7), in which
the first memory is a static random access memory (SRAM), and the second memory is a dynamic random access memory (DRAM).

(9) The spatial light modulator device according to any one of (1) to (7), in which
the first memory and the second memory are SRAMs.

(10) The spatial light modulator device according to any one of (1) to (7), in which
the first memory and the second memory are DRAMs.

(11) The spatial light modulator device according to any one of (1) to (10), further including:
a first circuit board on which the first memory is formed; and
a second circuit board on which the second memory is formed and which is stacked on the first circuit board, in which
the light modulation unit is stacked on the second circuit board.

(12) A spatial light modulator device, including:
a light modulation unit that performs a transition operation between a first state and a second state;
a first memory in which data for specifying which one state of the first state and the second state the light modulation unit is to be put in is written; and
a second memory in which the data retained in the first memory is written and which supplies the data to the light modulation unit.

(13) A spatial light modulator system, including:
a plurality of spatial light modulator devices each including a light modulation unit that performs a transition operation between a first state and a second state, a first memory in which data for specifying which one state of the first state and the second state the light modulation unit is to be put in is written during a transition time in which the transition operation is performed, and a second memory in which the data retained in the first memory is written after the transition time ends and which supplies the data to the light modulation unit;

a signal control unit which is connected to the first memory and supplies the data to the first memory;

a scan control unit which is connected to the first memory and writes the data supplied from the signal control unit in the first memory; and a drive control unit which is connected to the second memory and writes the data written in the first memory in the second memory.

(14) The spatial light modulator system according to (13), in which the signal control unit and the scan control unit perform writing of the data in the first memory during the transition time, and the drive control unit writes the data in the second memory from the first memory after the transition time ends.

(15) The spatial light modulator system according to (14), in which the drive control unit performs writing of the data in the second memory from the first memory collectively for all the plurality of spatial light modulator devices.

(16) The spatial light modulator system according to (14), in which the drive control unit performs writing of the data in the second memory from the first memory for each of the plurality of spatial light modulator devices.

(17) A display apparatus, including:

a spatial light modulator system including a plurality of spatial light modulator devices each including a light modulation unit that performs a transition operation between a first state and a second state, a first memory in which data for specifying which one state of the first state and the second state the light modulation unit is to be put in is written during a transition time in which the transition operation is performed, and a second memory in which the data retained in the first memory is written after the transition time ends and which supplies the data to the light modulation unit, a signal control unit which is connected to the first memory and supplies the data to the first memory, a scan control unit which is connected to the first memory and writes the data supplied from the signal control unit in the first memory, and a drive control unit which is connected to the second memory and writes the data written in the first memory in the second memory;

a light source that generates light incident on the spatial light modulator device; and a control unit that controls the light source and the spatial light modulator system on the basis of an image signal.

REFERENCE SIGNS LIST 100 display apparatus
110 spatial light modulator system
111 spatial light modulator device
120 light source unit
121 blue light source
122 green light source
123 red light source
130 optical system
135 projection lens
140 control unit
141 CPU
142 light source control unit
143 SLM control unit
144 signal acquisition unit
145 signal processing unit
151 light reflector
152 drive mechanism
153 circuit board
153a first circuit board
153b second circuit board
154 mirror electrode
155 first address electrode
156 second address electrode
157 first memory
158 second memory
171 signal control unit
172 scan control unit
173 drive control unit

The invention claimed is:

1. A spatial light modulator device, comprising:
a light modulation unit configured to perform a transition operation between a first state and a second state;
a first circuit board;
a first memory on the first circuit board, wherein
the first memory is configured to store data that specifies which one state of the first state and the second state the light modulation unit is to be put in, and
the data is written in the first memory during a transition time in which the transition operation is performed;
a second circuit board on the first circuit board, wherein the light modulation unit is on the second circuit board; and
a second memory on the second circuit board, wherein
the data stored in the first memory is written in the second memory after the transition time ends, and
the second memory is configured to supply the data to the light modulation unit.

2. The spatial light modulator device according to claim 1, wherein the light modulation unit includes:
a light reflector configured to reflect incident light, and
a drive mechanism configured to change an angle of the light reflector, and
the light reflector is inclined at a first angle in the first state and is inclined at a second angle in the second state.

3. The spatial light modulator device according to claim 2, wherein the transition time is a sum of an angle change time that is a time in which the angle of the light reflector is changed and a settling time that is a time until vibrations of the light reflector converge after the change of the angle.

4. The spatial light modulator device according to claim 2, wherein
the drive mechanism includes an address electrode connected to the second memory, and
the address electrode has a potential determined by the data.

5. The spatial light modulator device according to claim 4, wherein
the address electrode includes a first address electrode and a second address electrode, and
the data determines a potential difference between the first address electrode and the second address electrode and a reference potential.

6. The spatial light modulator device according to claim 5, wherein the light reflector includes a mirror electrode configured to cause electrostatic attraction between the first address electrode and the second address electrode and has the first angle or the second angle due to the electrostatic attraction.

7. The spatial light modulator device according to claim 2, wherein
the light reflector is a micromirror, and
the drive mechanism comprises a micro electro mechanical systems (MEMS).

8. The spatial light modulator device according to claim 1, wherein
the first memory is a static random access memory (SRAM), and
the second memory is a dynamic random access memory (DRAM).

9. The spatial light modulator device according to claim 1, wherein the first memory and the second memory are SRAMs.

10. The spatial light modulator device according to claim 1, wherein the first memory and the second memory are DRAMs.

11. A spatial light modulator device, comprising:
a light modulation unit configured to perform a transition operation between a first state and a second state;
a first circuit board;
a first memory on the first circuit board, wherein the first memory is configured to store data that specifies which one state of the first state and the second state the light modulation unit is to be put in;
a second circuit board on the first circuit board, wherein the light modulation unit is on the second circuit board; and
a second memory on the second circuit board, wherein
the data stored in the first memory is written in the second memory, and
the second memory is configured to supply the data to the light modulation unit.

12. A spatial light modulator system, comprising:
a plurality of spatial light modulator devices each including:
a light modulation unit configured to perform a transition operation between a first state and a second state,
a first circuit board,
a first memory on the first circuit board, wherein
the first memory is configured to store data that specifies which one state of the first state and the second state the light modulation unit is to be put in, and
the data is written in the first memory during a transition time in which the transition operation is performed,
a second circuit board on the first circuit board, wherein the light modulation unit is on the second circuit board, and
a second memory on the second circuit board, wherein
the data stored in the first memory is written in the second memory after the transition time ends, and
the second memory is configured to supply the data to the light modulation unit;
a signal control unit connected to the first memory, wherein the signal control unit is configured to supply the data to the first memory;
a scan control unit connected to the first memory, wherein the scan control unit is configured to write the data supplied from the signal control unit in the first memory; and
a drive control unit connected to the second memory, wherein the drive control unit is configured to write the data written in the first memory in the second memory.

13. The spatial light modulator system according to claim 12, wherein
the signal control unit and the scan control unit are further configured to write the data in the first memory during the transition time, and
the drive control unit is further configured to write the data in the second memory from the first memory after the transition time ends.

14. The spatial light modulator system according to claim 13, wherein the drive control unit is further configured to write the data in the second memory from the first memory collectively for all the plurality of spatial light modulator devices.

15. The spatial light modulator system according to claim 13, wherein the drive control unit is further configured to write the data in the second memory from the first memory for each of the plurality of spatial light modulator devices.

16. A display apparatus, comprising:
a spatial light modulator system including:
a plurality of spatial light modulator devices each including:
a light modulation unit configured to perform a transition operation between a first state and a second state,
a first circuit board,
a first memory on the first circuit board, wherein
the first memory is configured to store data that specifies which one state of the first state and the second state the light modulation unit is to be put in, and
the data is written in the first memory during a transition time in which the transition operation is performed,
a second circuit board on the first circuit board, wherein the light modulation unit is on the second circuit board, and
a second memory on the second circuit board, wherein
the data stored in the first memory is written in the second memory after the transition time ends, and
the second memory is configured to supply the data to the light modulation unit,
a signal control unit connected to the first memory, wherein the signal control unit is configured to supply the data to the first memory,
a scan control unit connected to the first memory, wherein the scan control unit is configured to write the data supplied from the signal control unit in the first memory, and
a drive control unit connected to the second memory, wherein the drive control unit is configured to write the data written in the first memory in the second memory;
a light source configured to generate light incident on the plurality of spatial light modulator devices; and
a control unit configured to control the light source and the spatial light modulator system based on an image signal.

* * * * *